(12) United States Patent
de Jong et al.

(10) Patent No.: US 11,100,715 B2
(45) Date of Patent: Aug. 24, 2021

(54) ESTABLISHMENT OF POSITIONAL TIMERS IN AN AUGMENTED REALITY ENVIRONMENT

(71) Applicant: International Business Machines Corporation, Armonk, NY (US)

(72) Inventors: Jackson B. de Jong, Irving, TX (US); Zachary J. Goodman, Euless, TX (US); Alan Cespedes, Irving, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/452,750

(22) Filed: Jun. 26, 2019

(65) Prior Publication Data

US 2020/0410760 A1 Dec. 31, 2020

(51) Int. Cl.
*G06T 19/00* (2011.01)
*G06F 3/01* (2006.01)
*G06N 20/00* (2019.01)

(52) U.S. Cl.
CPC ............ *G06T 19/006* (2013.01); *G06F 3/011* (2013.01); *G06N 20/00* (2019.01); *G06T 2219/024* (2013.01)

(58) Field of Classification Search
None
See application file for complete search history.

(56) References Cited

U.S. PATENT DOCUMENTS 9,791,936 B1 * 10/2017 Kovach .................... G09G 5/12
10,074,381 B1    9/2018 Cowburn et al.
10,085,585 B2 * 10/2018 Siegel ................... A47J 36/321
2007/0024613 A1    2/2007 Jung et al.
2007/0198939 A1    8/2007 Gold
2016/0306172 A1 * 10/2016 Chestnut ................. G09B 5/00

(Continued)

FOREIGN PATENT DOCUMENTS

WO        2018165038 A1    9/2018

OTHER PUBLICATIONS

Bonanni et al. "Counterintelligence: Augmented Reality Kitchen" (Year: 2005).*

(Continued)

*Primary Examiner* — Hilina K Demeter
(74) *Attorney, Agent, or Firm* — Richard Wilhelm; Edell, Shapiro & Finnan, LLC

(57) ABSTRACT

A method, system, and computer program product are provided for establishing positional timers in an environment. A computing device receives an initial position for a timer in an augmented reality environment and an association of a context object with the timer. The position of the timer is fixed with respect to a position of the context object such that the position of the timer moves when the context object is moved. The computing device receives access control information regarding the timer. The access control information specifies one or more users who are permitted to view the timer. The computing device sets an expiration condition for the timer, wherein the expiration condition is provided by the user or derived based on crowdsourced information from feedback provided by multiple users. Upon timer expiration, an indication of the expiration is provided to the one or more users permitted to view the timer.

19 Claims, 8 Drawing Sheets

(56) References Cited

U.S. PATENT DOCUMENTS

| | | | |
|---|---|---|---|
| 2017/0153779 A1 | 6/2017 | DeLuca et al. | |
| 2017/0205077 A1* | 7/2017 | Seo | F24C 7/087 |
| 2017/0243515 A1* | 8/2017 | Vengroff | A47J 37/108 |
| 2017/0329497 A1 | 11/2017 | DeLuca et al. | |
| 2018/0073744 A1* | 3/2018 | Ji | F24C 15/105 |
| 2018/0322706 A1* | 11/2018 | Drouin | G06K 9/00201 |
| 2019/0125120 A1* | 5/2019 | Jenkins | A47J 36/321 |
| 2019/0139444 A1* | 5/2019 | LeeKong | G09B 5/065 |

OTHER PUBLICATIONS

Wearvr, "Audio Clock for Oculus Rift," [Accessed Mar. 22, 2019] https://www.wearvr.com/apps/audio-clock-for-oculus-rift, 1 page.

Anonymous, "Projected Images for Fully Integrated Appliances," IP.com Disclosure No. IPCOM000190375D, Publication Date: Nov. 25, 2009, 4 pages.

E. Stinson, "MIT's Reality Editor App Lets You Reprogram the World With Augmented Reality." Dec. 14, 2015 [Accessed Mar. 22, 2019]. https://www.wired.com/2015/12/mits-reality-editor-app-lets-you-reprogram-the-world-with-augmented-reality/, 3 pages.

Newsbeezer, "Kitchen timer floating in the air" themes, with Apple's AR feature | Mogura VR—VR / AR / MR update in Japan and abroad. Jul. 20, 2018 [Accessed Mar. 22, 2019]. https://newsbeezer.com/japaneng/kitchen-timer-floating-in-the-air-themes-with-apples-ar-feature-mogura-vr-vr-ar-mr-update-in-japan-and-abroad/, 2 pages.

B. Bell et al., "View Management for Virtual and Augmented Reality," ACM Symp. on User Interface Software and Technology, Nov. 2001, 10 pages.

T. Tall, "Augmented Reality vs. Virtual Reality vs. Mixed Realitym—An Introductory Guide," Oct. 24, 2017 [accessed Jun. 25, 2019]. https://www.toptal.com/designers/ui/augmented-reality-vs-virtual-reality-vs-mixed-reality/, 21 pages.

\* cited by examiner

ESTABLISHMENT OF POSITIONAL TIMERS IN AN AUGMENTED REALITY ENVIRONMENT

BACKGROUND

1. Technical Field

Present invention embodiments relate to establishment of positional timers in an augmented reality environment, and more specifically, to establishment of contextual positional timers in an augmented reality environment and correlation of the positional timers in one of a virtual reality environment and a mixed reality environment.

2. Discussion of the Related Art

Timers are used for a number of activities including, but not limited to, cooking. In fact, it's not unusual to use multiple timers for different aspects of an activity. For example, when cooking, one may use a first timer for potatoes, a second timer for green beans, and a third timer for meat. As a number of timers increases, timer management becomes more difficult. Some computer-implemented timer interfaces may include a user-defined label or note to be associated with a timer. Without such a highly descriptive label or note, a user may have difficulty determining an association between an object and its timer.

SUMMARY

According to one embodiment of the present invention, a computer-implemented method for establishing positional timers in an environment is provided. According to the method, a computing device receives an initial position for a timer in an augmented reality environment and an association of a context object with the timer. The position of the timer is fixed with respect to a position of the context object such that the position of the timer moves with the context object when the context object is moved. The computing device receives access control information regarding the timer. The access control information specifies one or more users who are permitted to view the timer. The computing device sets an expiration condition for the timer, wherein the expiration condition is one of provided by the user and derived based on crowd sourced information from feedback provided by multiple users. Upon expiration of the timer, the computing device provides an indication of the expiration to the specified one or more users who are permitted to view the timer.

According to a second embodiment, a computer system is provided for establishing positional timers in the environment. The computer system includes at least one processor, and a memory connected to the at least one processor. The memory includes instructions to configure the at least one processor to perform a number of steps. According to the steps, the at least one processor is configured to receive an initial position for a timer in an augmented reality environment and an association of a context object with the timer. Access control information is received regarding the timer, wherein the access control information specifies one or more users who are permitted to view the timer. An expiration condition for the timer is set, wherein the expiration condition is either provided by a user or derived based on crowdsourced information from multiple users. Upon an expiration of the timer, an indication of the expiration is provided to the one or more specified users permitted to view the timer.

According to a third embodiment, a computer program product for establishing positional timers in an environment is provided. The computer program product includes at least one computable readable storage medium having computer readable program code embodied therewith for execution on at least one processor of a computer system. The computer readable program code is configured to be executed by the at least one processor to perform a number of steps. According to the steps, an initial position for a timer in an augmented reality environment and an association of a context object with the timer is received, wherein the environment is an augmented reality environment. An expiration condition for the timer is set, wherein the expiration condition is either provided by a user from whom the initial position of the timer was received, or derived based on crowdsourced information from multiple users. Upon an expiration of the timer, an indication of the expiration of the timer is provided to one or more users permitted to view the timer.

BRIEF DESCRIPTION OF THE DRAWINGS

Generally, like reference numerals in the various Figs. are utilized to designate like components.

DETAILED DESCRIPTION

Figure 1:
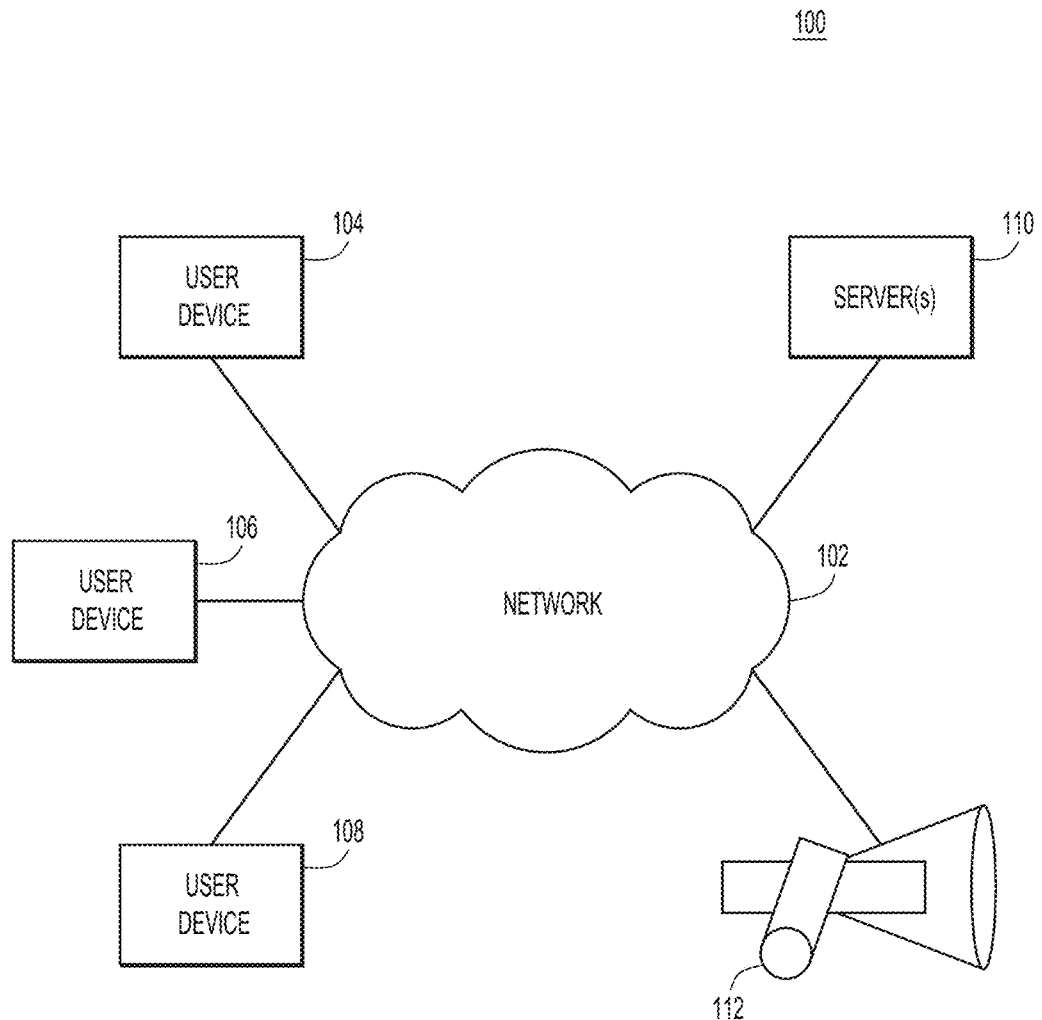
FIG. 1 illustrates an example environment in which various embodiments may be implemented.

Although augmented reality, virtual reality, and mixed reality have a number of things in common, they are not identical. In an augmented reality environment, a real world environment is enhanced by virtual details. In a virtual reality environment, the environment is a fully enclosed, synthetic experience with a user having no sense of the real world environment. In a mixed reality environment, a user may interact with and manipulate both the real and virtual environments.

In various embodiments, a user of an augmented reality device may view a scene including one or more objects for which the user may indicate a desire to generate a timer and may associate the timer with an object of the one or more objects. Via the augmented reality device, the user may see the timer located near the object with at least a visual indication of the association between the timer and the object. The user may set an expiration condition for the timer and may define an event to be triggered upon expiration of the timer.

In some embodiments, the timer may be defined as either a countdown timer or a count-up timer. A countdown timer may initially be set to a given time interval and may count units of time backwards until the countdown timer reaches a value of zero, at which point the countdown timer is considered to be expired. The units of time may be seconds or another suitable unit of time. A count-up timer may initially be set to zero and may count each passing unit of time until the count-up timer reaches a given time interval, at which point the count-up timer is considered to be expired.

The user who generated the timer may provide access control information regarding the timer. The access control information may specify one or more first users who are permitted to view the timer, one or more second users who are permitted to edit the timer, one or more third users who are permitted to delete the timer, one or more fourth users who are permitted to correlate the timer in an augmented reality environment with a timer in either a virtual reality environment or a mixed reality environment, and one or more fifth users who are permitted to provide access control information regarding the timer.

Alternatively, the access control information may specify one or more sixth users who are not permitted to view the timer, one or more seventh users who are not permitted to edit the timer, one or more eighth users who are not permitted to delete the timer, one or more ninth users who are not permitted to correlate the timer in an augmented reality environment with a timer in either a virtual reality environment or a mixed reality environment, and one or more tenth users who are permitted to provide access control information regarding the timer. In this alternative embodiment, for example, if all users except for John are permitted to see the timer, then the access control information may specify John as a user not permitted to see the timer, while all other users are permitted to see the timer.

An example environment 100 for use with present invention embodiments is illustrated in FIG. 1. Specifically, environment 100 may include one or more servers 110 and one or more clients or user devices 104, 106, 108, 112. Server(s) 110 and user devices 104, 106, 108, 112 may be remote from each other and communicate over a network 102. The network may be implemented by any number of any suitable communications media (e.g., wide area network (WAN), local area network (LAN), Internet, Intranet, etc.). Alternatively, server(s) 110 and user devices 104, 106, 108, 112 may be local to each other, and may communicate via any appropriate local communication medium (e.g., local area network (LAN), hardwire, wireless link, Intranet, etc.).

User device 112 is shown as a headset capable of permitting a user to view at least one of an augmented reality environment, a virtual reality environment, and a mixed reality environment. Each of user devices 104, 106, 108 may be any one of a headset, a smartphone, a tablet, or other device capable of showing a real world environment augmented with virtual objects. User devices 104, 106, 108 may also be capable of showing at least one of a virtual reality environment and a mixed reality environment.

Figure 2:
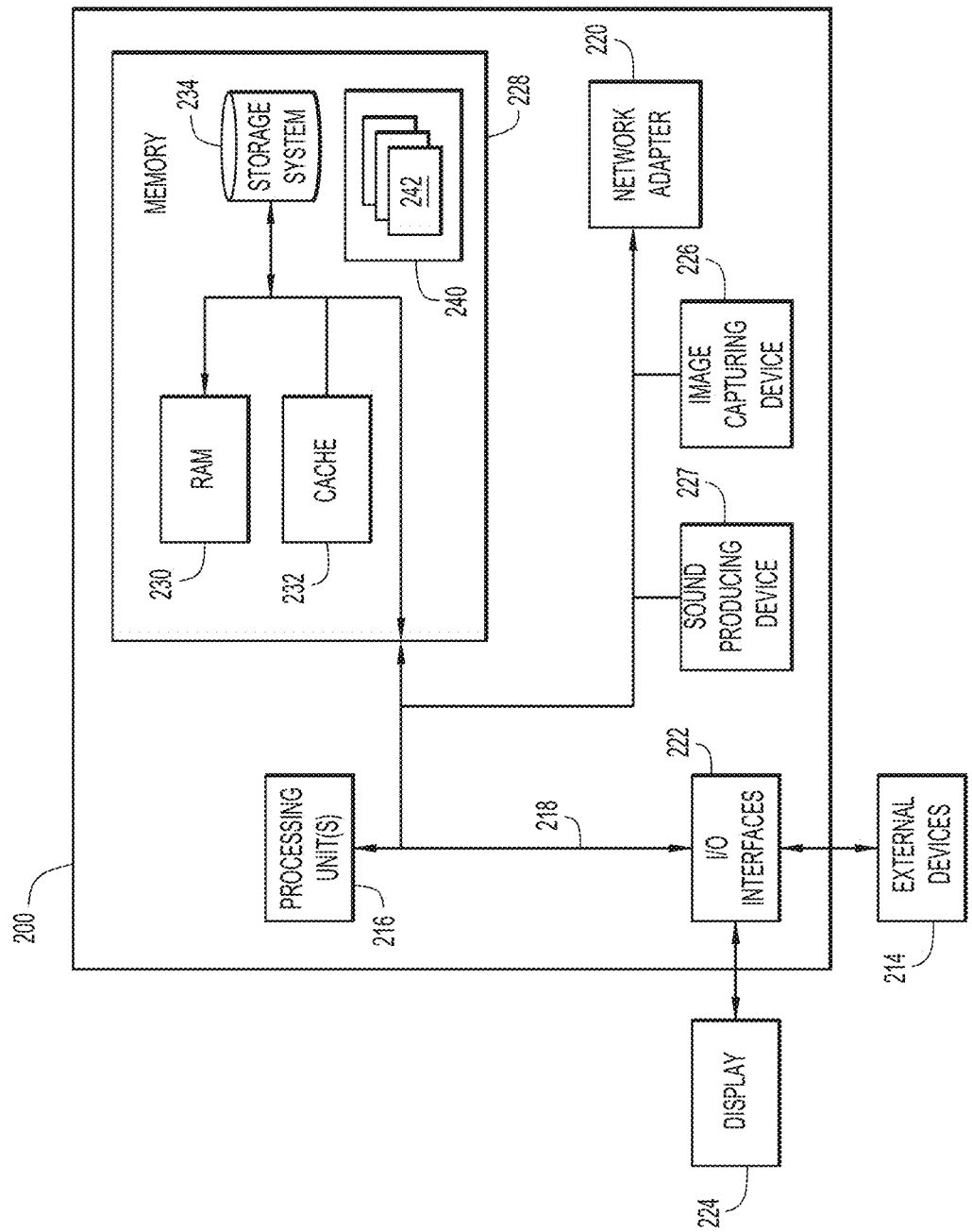
FIG. 2 is a functional block diagram for a user device of environment.

Referring now to FIG. 2, a schematic of an example user device, which may implement any of user devices 104, 106, 108, 112 in various embodiments, is shown. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

One or more processing units 216 may be connected with a sound producing device 227 and an image capturing device 226 via bus 218. In some embodiments, sound producing device 227 may include a speaker for reproducing a number of different sounds and image capturing device 226 may capture real world images and may provide the real world images to a display 224, via bus 218, one or more processing units 216 and I/O interfaces 222, and to server(s) 110.

Figure 3:
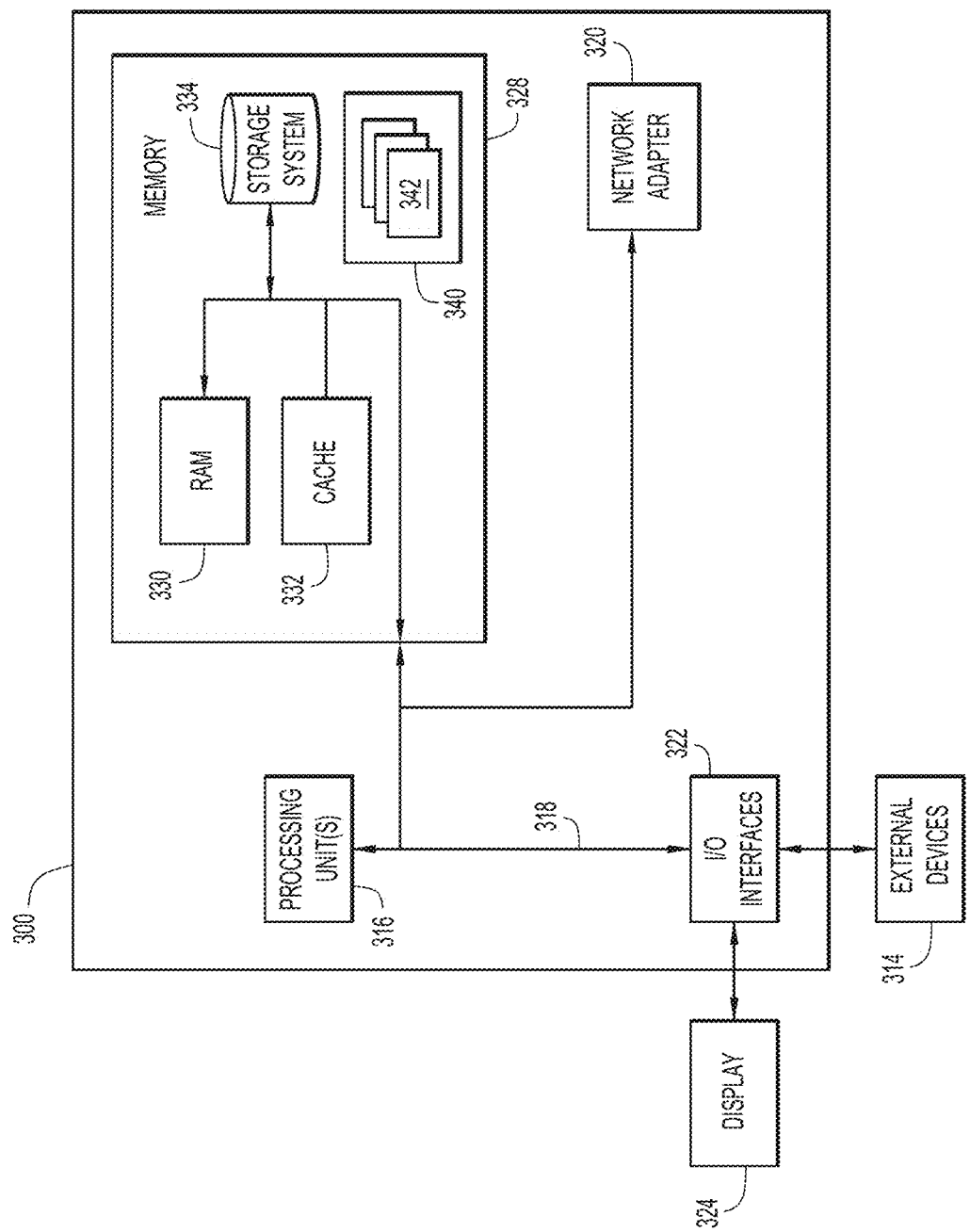
FIG. 3 is a functional block diagram of a computing device for one or more servers of the environment.

Referring now to FIG. 3, a schematic of an example computer system 300 which may implement any of server(s) 110 in various embodiments. Computer system 300 is shown in a form of a general-purpose computing device. Components of computer system 300 may include, but are not limited to, one or more processors or processing units 316, a system memory 328, and a bus 318 that couples various system components including system memory 328 to one or more processing units 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 300 may include a variety of computer system readable media. Such media may be any available media that is accessible by computer system 300, and may include both volatile and non-volatile media, removable and non-removable media.

System memory 328 can include computer system readable media in the form of volatile memory, such as random access memory (RAM) 330 and/or cache memory 332. Computer system 300 may further include other removable/non-removable, volatile/non-volatile computer system storage media. By way of example only, storage system 334 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, the one or more application programs, the other program modules, and the program data or some combination thereof, may include an implementation of a networking environment. Program modules 342 generally carry out the functions and/or methodologies of embodiments of the invention as described herein.

Computer system 300 may also communicate with one or more external devices 314 such as a keyboard, a pointing device, one or more displays 324, one or more devices that enable a user to interact with computer system 300, and/or any devices (e.g., network card, modem, etc.) that enable computer system 300 to communicate with one or more other computing devices. Such communication can occur via Input/Output (I/O) interfaces 322. Still yet, computer system 200 can communicate with one or more networks such as a local area network (LAN), a general wide area network (WAN), and/or a public network (e.g., the Internet) via network adapter 320. As depicted, network adapter 320 communicates with the other components of computer system 300 via bus 318. It should be understood that, although not shown, other hardware and/or software components could be used in conjunction with computer system 300. Examples, include, but are not limited to: a microphone, one or more speakers, microcode, device drivers, redundant processing units, external disk drive arrays, RAID systems, tape drives, and data archival storage systems, etc.

Figure 4:
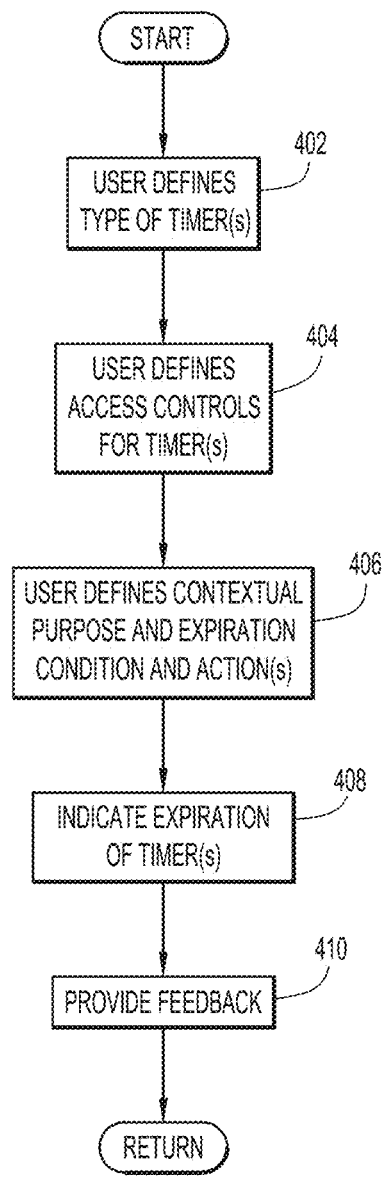
FIG. 4 is a flowchart that illustrates an example process for generating a positional timer according to various embodiments.

FIG. 4 is a flowchart of an example process that may be performed by any of user devices 104, 106, 108, 112 and by server(s) 110. The process may begin with a user defining a desired type of timer (act 402). The user may define the desired type of timer by speaking one or more voice commands into a microphone of any of user devices 104, 106, 108, 112, making one or more gestures via a touchscreen of any of user device 104, 106, 108, 112 (if any), capturing one or more gestures via image capturing device 226 of any of user device 104, 106, 108, 112, or via other methods. Any of user device 104, 106, 108, 112 then may send a communication to one or more servers 110 via network 102 to define the desired type of timer. In some embodiments, the types of timers may include a countdown timer, which is initially set to a desired time interval and counts down each time unit until reaching zero, and a count-up timer, which is initially set to zero and counts up each time unit until reaching the desired time interval. The time unit may be one second or another suitable time unit.

As an example, a countdown timer may be initially set to 05:00 (5 minutes and 0 seconds) and may be considered expired upon reaching 0:00 (0 minutes and 0 seconds), and a count-up timer may be initially set to 0:00 (0 minutes and 0 seconds) and may be considered expired upon reaching a desired time interval such as 5:00 (5 minutes and 0 seconds) or another desired time interval.

Next, the user may define access controls for the timer (act 404). The user may define the access controls via a keyboard or touchscreen of any of user devices 104, 106, 108, 112, by speaking one or more commands which are received by a microphone of any of user devices 104, 106, 108, 112, or by other methods. Access control information may then be provided to server(s) 110 via network 102.

The access control information may specify one or more first users who are permitted to view the timer, one or more second users who are permitted to edit the timer, one or more third users who are permitted to delete the timer, one or more fourth users who are permitted to correlate the timer in an augmented reality environment with a timer in either a virtual reality environment or a mixed reality environment, and one or more fifth users who are permitted to provide access control information regarding the timer.

Alternatively, the access control information may specify one or more sixth users who are not permitted to view the timer, one or more seventh users who are not permitted to edit the timer, one or more eighth users who are not permitted to delete the timer, one or more ninth users who are not permitted to correlate the timer in an augmented reality environment with a timer in either a virtual reality environment or a mixed reality environment, and one or more tenth users who are not permitted to provide access control information regarding the timer.

The user may then define a contextual purpose, an expiration condition, and an action or a sequence of actions to be performed upon expiration of the timer (act 406). The user may define the contextual purpose by pointing to an object, which is to become a context object associated with the timer. The user pointing may be captured by image capturing device 226 of any of user devices 104, 106, 108, 112. Alternatively, the user may define the contextual purpose via a touchscreen of any of user devices 104, 106, 108, 112, via speaking one or more commands including an identification of an object that is to become a context object, via typing one or more commands including an identification of the object, by using a keyboard, or via other methods. The timer then may be activated. In some embodiments, the timer may automatically be activated.

Upon expiration of the timer, the user who defined the timer may be notified of the expiration (act 408). The notification may be a visual notification or an auditory notification. For example, if the user is viewing the timer, the user may see, for example, the timer blinking, the timer changing its color, an icon or a message appearing over or near the timer, etc. Alternatively, the user may hear a predefined sound associated with the timer expiring, the user may hear an announcement informing the user of the expired timer, etc.

If the user is viewing a scene that does not include the timer at a time the timer expires, the user may hear any of the audio notifications described above, or another audio notification. Alternatively, the user may see a visual notification, such as an arrow pointing toward a location of the expired timer, a textual message indicating which timer expired, or another type of visual notification.

After the user no longer needs the timer, which the user may indicate by canceling or deleting the timer, the user may either be prompted to provide feedback or may indicate a desire to provide feedback concerning the timer. The user may provide the feedback such as, for example, the timer was too short, the timer was too long, the timer was just right, or other feedback (act 410).

Figure 5:
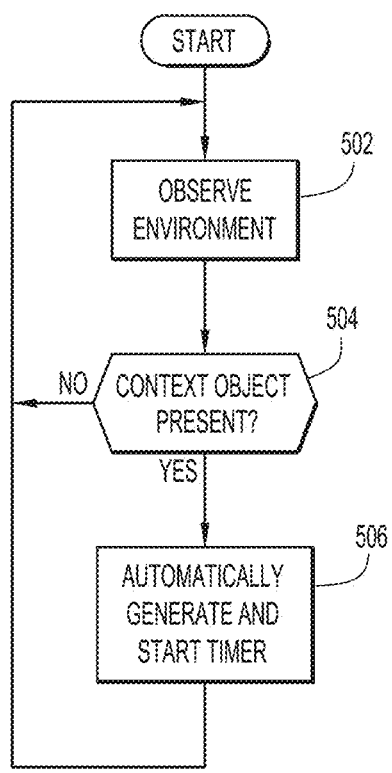
FIG. 5 is a flowchart of an example process for automatically generating a timer upon recognizing an object previously associated with a timer.

In various embodiments, server(s) 110 may learn when a user uses timers and types of timers the user uses based on historical timer use behavior of the user. FIG. 5 is a flowchart of an example process that may be performed by any of user devices 104, 106, 108, 112 and server(s) 110 in such embodiments.

The process may begin with any one of user device 104, 106, 108, 112 observing an environment and server(s) 110 receiving image information of the environment from image capturing device 226 from the any one of user device 104, 106, 108, 112 via network 102 (act 502). Next, server(s) 110 may use machine vision processing of the image information to determine whether an object corresponding to a known context object of the user, as learned from historical timer behavior of the user, is present according to the received image information (act 504).

If, during act 504, server(s) 110 determines that a known context object corresponds to an object having its image present in the image information, then server(s) 110 may automatically generate a timer of a particular type based upon determining that a known context object corresponds to the object having its image present in the image information. Server(s) 110 may send information to the any one of user device 104, 106, 108, 112 to make the automatically generated timer visible to the user, associated with the object, and activated (act 506). Otherwise, if server(s) 110 fails to recognize any object image in the image information as corresponding to a known context object, then server(s) 110 may continue to observe the environment based on the received image information (act 502).

Figure 6:
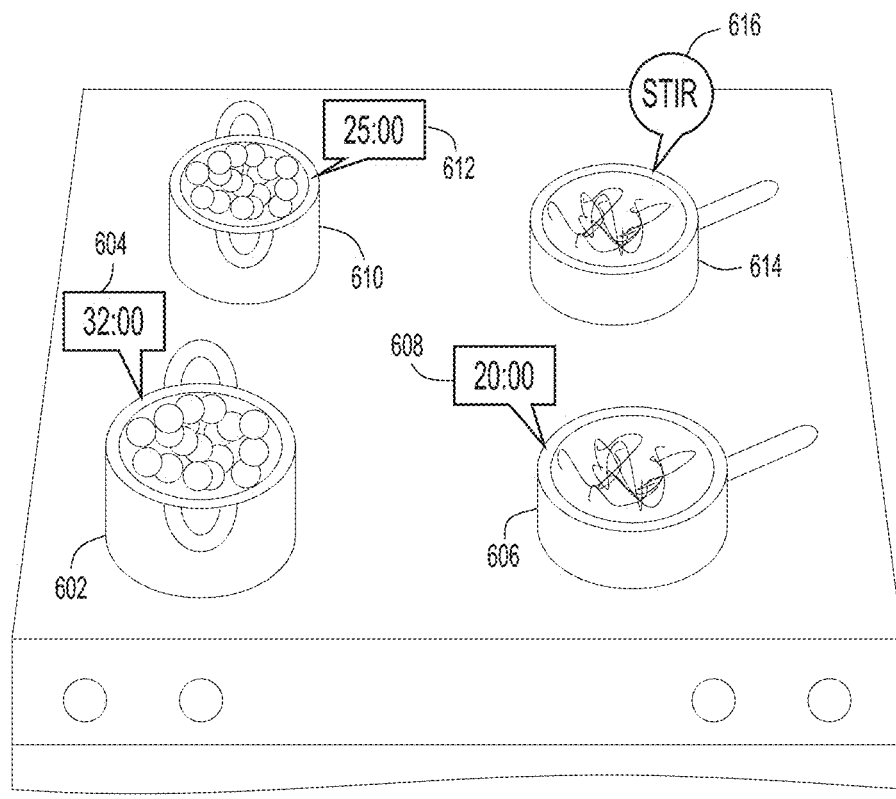
FIG. 6 illustrates an example use case in which respective timers are associated with respective items cooking on a stove top according to an embodiment of the present invention.

FIG. 6 illustrates an example use of timers. For example, timers 604, 608 and 612 may be countdown timers showing an amount of time remaining before corresponding timer expiration. As shown, timer 604 will expire in exactly 32 minutes, timer 608 will expire in exactly 20 minutes, and timer 612 will expire in exactly 25 minutes. Timer 616 may be a countdown timer associated with an activity. In FIG. 6, timer 616 may have an initial setting of exactly 2 minutes and upon expiration, an indication may be displayed informing the user to perform an action such as, for example, stir, or another action. In some embodiments, when captured image information is determined to be indicating that the action, for example, stirring, is taking place, timer 616 may be reset to 2 minutes (2:00) and may begin counting down a next interval of time. Each of timers 604, 608, 612, 616 may be associated with respective context objects 602, 606, 610, 614.

Figure 7:
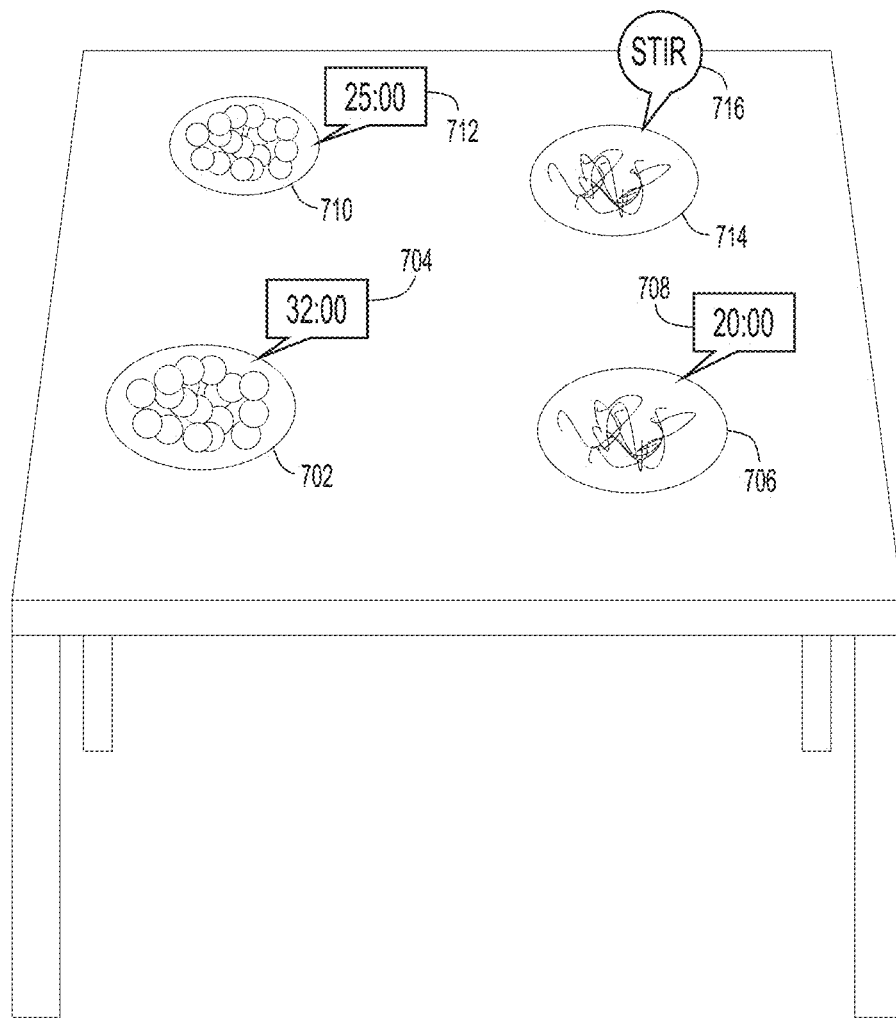
FIG. 7 shows a virtual reality environment correlated with timers shown in an augmented reality environment of FIG. 6.

In some embodiments, a user may indicate a desire to map timers and associated context objects from an augmented reality environment to a virtual reality environment or a mixed reality environment. The user may indicate the desire by using voice commands, making gestures captured by image capturing device 226, using a touch screen or a keyboard, or via other methods. FIG. 7 shows a virtual reality environment including a table having thereon plated food items 702, 706, 710 and 714, corresponding, respectively, to contextual items 602, 606, 610 and 614. Timers 704, 708, 712 and 716 correspond, respectively, to timers 604, 608, 612 and 616 in FIG. 6.

Figure 8:
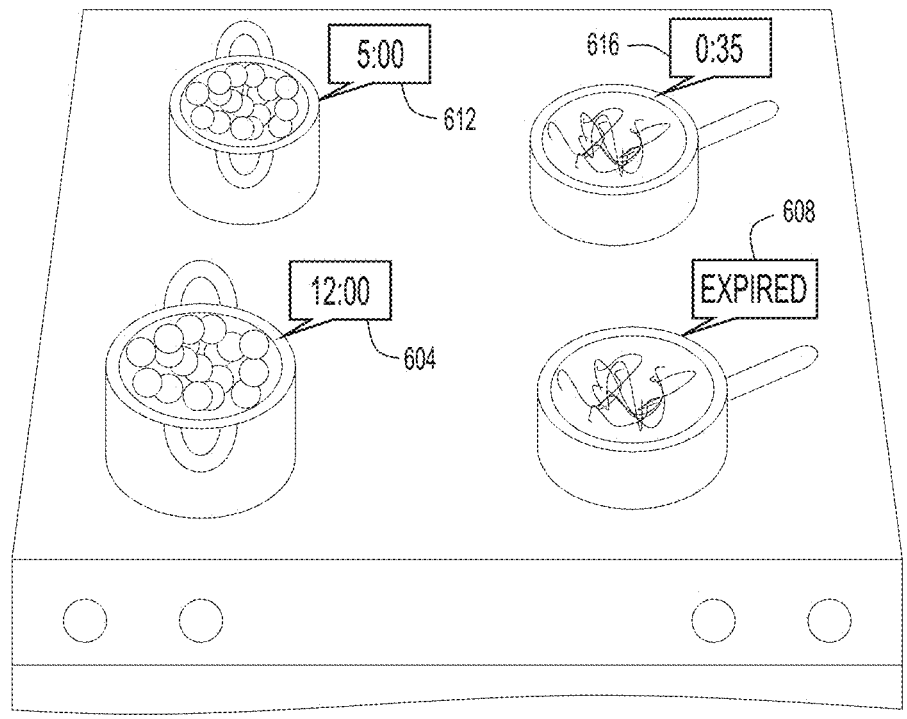
FIG. 8 shows the timers of FIG. 6 after one of the timers expired.

FIG. 8 is similar to FIG. 6. However, according to timers 604, 608 and 612, in FIG. 8, 20 minutes have elapsed as compared with FIG. 6. Therefore, timer 604 shows that a time interval of 12 minutes remains and timer 612 shows that a time interval of five minutes remains. Timer 616 shows that 35 seconds remain before prompting the user to stir. Timer 608 is showing that it has expired.

In some embodiments, a user may request to view a list of timers that are visible to the user based on access control information. The list may include user-defined labels for each timer and also may include a corresponding status including, but not limited to, active with an amount of time remaining before expiration, or expired, as well as a timer type including, but not limited to, countdown and count-up.

Figure 9:
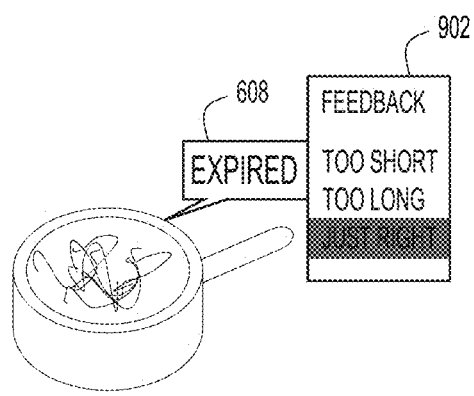
FIG. 9 illustrates an example method by which a user may provide feedback regarding an expired timer according to an embodiment of the present invention.

As previously mentioned, in some embodiments, a user may be prompted to provide feedback regarding a timer. FIG. 9 shows expired timer 608 and a prompt for feedback 902. In this example prompt, the user may be prompted to provide feedback of any one of "too short", "too long" and "just right". FIG. 9 shows that the user selected the feedback of "just right".

It will be appreciated that the embodiments described above and illustrated in the drawings represent only a few of the many ways of implementing various embodiments. For example, although, the above-mentioned example embodiments include a user device communicating with one or more servers, other embodiments may include standalone user devices.

The above-mentioned embodiments describe a position of a timer being associated with and located near its corresponding context object. However, in other embodiments, a user may indicate, via any of the methods previously described, that the position of the timer is to be fixed in a field of view of a user. For example, the user may indicate that the timer is to be positioned in a bottom right portion of a field of view of the user, or in any other portion of the field of view of the user. In such an embodiment, the timer would remain visible in the designated position in the user's field of view regardless of where the user looks in the environment.

Further, because a user defining a timer may specify access controls of other users with respect to the timer, the user may define a group of users who may view and edit the timer such that collaboration among the users regarding the timer can be possible.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, microphone, touchscreen, etc.). The interface screens may include any suitable actuators (e.g., links, tabs, etc.) to navigate between the screens in any fashion.

The present invention embodiments are not limited to the specific tasks or algorithms described above, but may be utilized for timing any event or activity such as, for example, indicating when an event is to begin, indicating when a project is to be completed, indicating when a next task or activity is to begin, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim as our invention:

1. A computer-implemented method for establishing positional timers in an environment, the computer-implemented method comprising:
    receiving, by a computing device, an initial position for a timer in an augmented reality environment and an association of a context object with the timer, the position of the timer being fixed with respect to a position of the context object such that the position of the timer moves with the context object when the context object is moved;
    receiving, by the computing device, access control information regarding the timer from a user generating the timer, the access control information including information specifying one or more other users permitted to view the timer, one or more other users permitted to edit the timer, one or more other users permitted to delete the timer, and one or more other users permitted to change the access control information regarding the timer;
    setting, by the computing device, an expiration condition for the timer, the expiration condition being one of provided by the user generating the timer and derived based on crowdsourced information from feedback provided by a plurality of users; and
    upon expiration of the timer, providing an indication of the expiration of the timer to the user generating the timer and the specified one or more other users permitted to view the timer.

2. The computer-implemented method of claim 1, further comprising:
    machine learning, by the computing device, a user's expiration condition for a timer associated with the context object based on repeated use of a timer associated with the context object.

3. The computer-implemented method of claim 2, further comprising:
    determining, by the computing device via machine vision, a presence of the context object associated with observed timer use behavior by the user;
    automatically generating, by the computing device, a new timer associated with the context object based on the determining, an expiration condition of the new timer being automatically set based on the observed timer use behavior by the user; and
    automatically generating, by the computing device, access control information regarding the new timer, the access control information for the new timer specifying which of at least one other user are allowed to view the new timer based on the observed timer use behavior by the user.

4. The computer-implemented method of claim 1, further comprising:
    triggering at least one event upon expiration of the timer.

5. The computer-implemented method of claim 1, further comprising:
    receiving, by the computing device, an initial position for a second timer in the augmented reality environment and an association of a second context object with the second timer in the augmented reality environment, the position being a user-specified position of a field of view of the user, the position of the second timer remaining fixed in the user-specified position of the field of view regardless of a change in the field of view.

6. The computer-implemented method of claim 1, further comprising:
    upon the expiration of the timer, providing an indication of a direction of a location where the timer is visible when the timer is not in a field of view of a user permitted to view the timer.

7. The computer-implemented method of claim 1, further comprising:
    receiving, by the computing device, information regarding an event for causing the timer to restart;
    determining, by the computing device, an occurrence of the event by use of machine vision; and
    automatically restarting, by the computing device, the timer based on the determining of the occurrence of the event.

8. A computer system for establishing positional timers in an environment, the computer system comprising:
    at least one processor; and
    a memory connected to the at least one processor, the memory including instructions to configure the at least one processor to:
        receive an initial position for a timer in an augmented reality environment and an association of a context object with the timer;
        receive access control information regarding the timer from a user generating the timer, the access control information including information specifying one or more other users permitted to view the timer, one or more other users permitted to edit the timer, one or more other users permitted to delete the timer, and one or more other users permitted to change the access control information regarding the timer;
        set an expiration condition for the timer, the expiration condition being one of provided by the user generating the timer and derived based on crowdsourced information from a plurality of users; and
        upon expiration of the timer, provide an indication of the expiration of the timer to the user generating the timer and the specified one or more other users permitted to view the timer.

9. The computer system of claim 8, wherein the instructions further configure the at least one processor to correlate the timer in the augmented reality environment to a timer in one of a virtual reality environment and a mixed reality environment.

10. The computer system of claim 8, wherein:
    the timer is one of a countdown timer and a count-up timer, and
    the instructions further configure the at least one processor to present a plurality of timers in a list view.

11. The computer system of claim 8, wherein the instructions further configure the at least one processor to learn, by machine learning, an expiration condition for a new timer associated with the context object based on repeated use of a timer associated with the context object.

12. The computer system of claim 11, wherein the instructions further configure the at least one processor to:
learn, via machine vision, a respective context object and a corresponding context associated with monitored timer use behavior by a user;
automatically generate a new timer associated with the respective context object and the respective context based on the learned respective context object and the corresponding context; and
automatically generate access control information regarding the new timer, the access control information for the new timer specifying which of at least one user is allowed to view the new timer based on the monitored timer use behavior by the user.

13. The computer system of claim 12, wherein the instructions further configure the at least one processor to:
automatically set an expiration condition of the new timer based on monitoring timer use behavior by one or more users.

14. The computer system of claim 8, wherein:
the initial position of the timer being fixed with respect to a position of a context object such that a position of the timer moves with the context object when the context object is moved.

15. The computer system of claim 8, wherein the initial position of the timer is fixed with respect to a position in a field of view.

16. A computer program product for establishing positional timers in an environment, the computer program product comprising at least one computer readable storage medium having computer readable program code embodied therewith for execution on at least one processor of a computer system, the computer readable program code being configured to be executed by the at least one processor to:

receive an initial position for a timer in an augmented reality environment and an association of a context object with the timer;
receive access control information regarding the timer from a user generating the timer, the access control information including information specifying one or more other users permitted to view the timer, one or more other users permitted to edit the timer, one or more other users permitted to delete the timer, and one or more other users permitted to change the access control information regarding the timer;
set an expiration condition for the timer, the expiration condition being one of provided by a user generating the timer and derived based on crowdsourced information from a plurality of users; and
upon expiration of the timer, provide an indication of the expiration of the timer to the user generating the timer and the specified one or more other users permitted to view the timer.

17. The computer program product of claim 16, wherein the initial position of the timer is fixed in relation to a position of the context object.

18. The computer program product of claim 16, wherein the computer readable program code is further configured to be executed by the at least one processor to:
correlate a position for the timer in the augmented reality environment with a position of a timer in one of a virtual reality environment and a mixed reality environment.

19. The computer program product of claim 16, wherein the computer readable program code is further configured to be executed by the at least one processor to:
receive new access control information regarding the timer, the new access control information specifying one or more other users who are not permitted to view the timer.

* * * * *